United States Patent [19]

Carlson, Jr. et al.

[11] Patent Number: 4,489,508

[45] Date of Patent: Dec. 25, 1984

[54] VAPOR CONDENSATION APPARATUS HAVING CONDENSER COIL MODULES

[75] Inventors: Roy C. Carlson, Jr., Boxford, Mass.; Edward J. March, Yardley, Pa.

[73] Assignee: AT&T Technologies, Inc., New York, N.Y.

[21] Appl. No.: 417,729

[22] Filed: Sep. 13, 1982

[51] Int. Cl.³ .............................................. F26B 9/06
[52] U.S. Cl. ........................................ 34/78; 118/61; 118/733; 228/180 R; 228/242
[58] Field of Search ................. 34/78; 134/11, 31; 165/78; 118/733, 732, 729, 715, 719, 61, 62, 718, 58; 228/240, 242, 180 R

[56] References Cited

U.S. PATENT DOCUMENTS

| | | | |
|---|---|---|---|
| 3,663,293 | 5/1972 | Suprenant et al. | 134/11 |
| 3,904,102 | 9/1975 | Chu et al. | 134/107 |
| 4,032,033 | 6/1977 | Chu et al. | 134/11 |
| 4,098,005 | 7/1978 | Wiarda | 134/11 |
| 4,187,974 | 2/1980 | Mahajan | 165/105 |
| 4,253,516 | 3/1981 | Giardina | 165/78 |
| 4,389,797 | 6/1983 | Spigarelli et al. | 34/78 |

Primary Examiner—Larry I. Schwartz
Attorney, Agent, or Firm—D. D. Bosben

[57] ABSTRACT

Vapor condensation mass soldering apparatus (46) is of modular construction and includes a primary vapor zone assembly (50), a secondary vapor zone assembly (52), an ambient air moisture-removal zone assembly (54) and a hood assembly (56) mounted in readily separable, vertically stacked relationship. An article load-unload assembly (48) is secured to the front of the other assemblies (50, 52, 54 and 56). Each of the zone assemblies (50, 52 and 54) also includes respective condenser coil modules (142, 150 and 154) of special construction which can readily be mounted on and removed from their respective assemblies as integral units.

9 Claims, 5 Drawing Figures

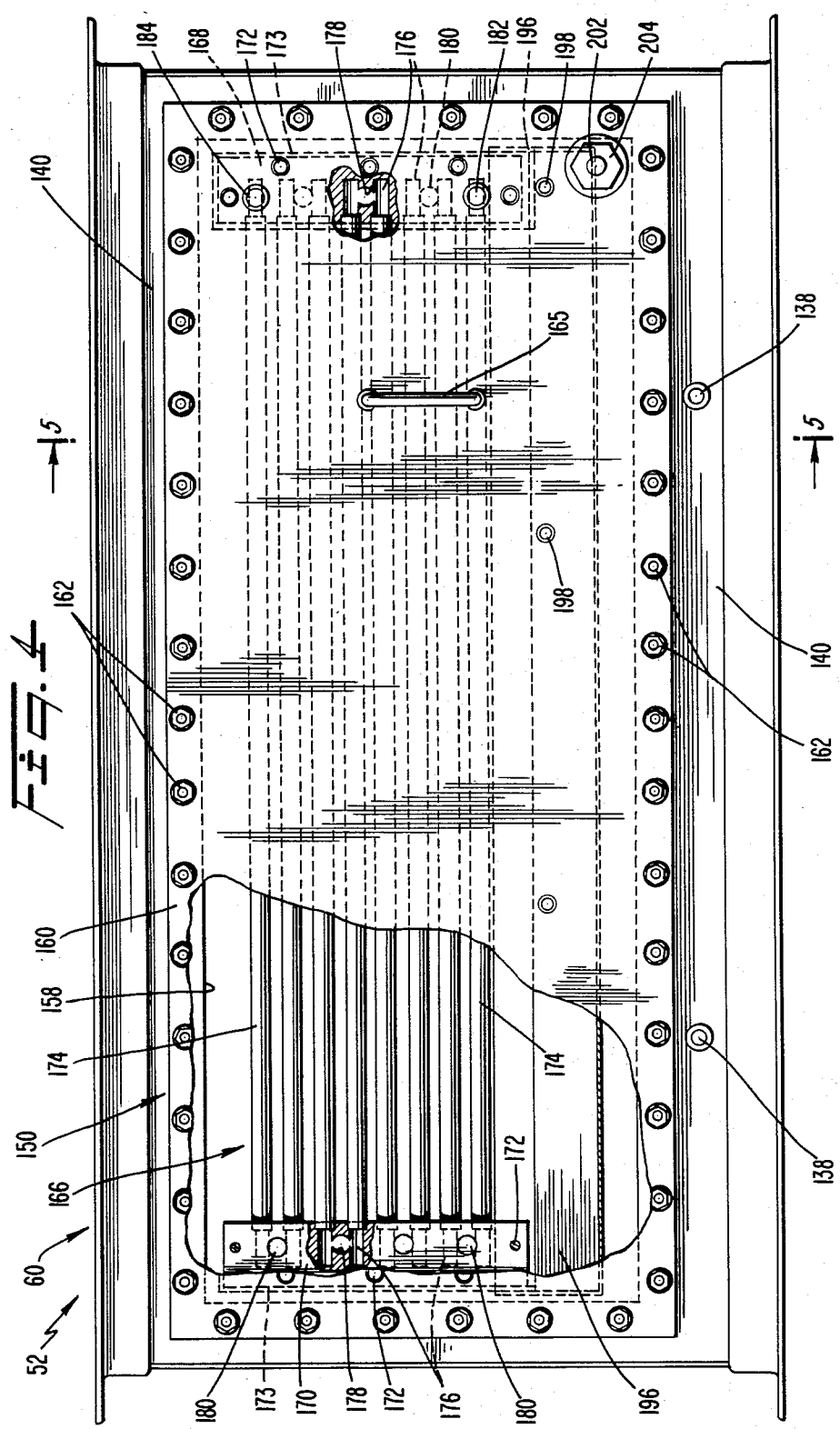

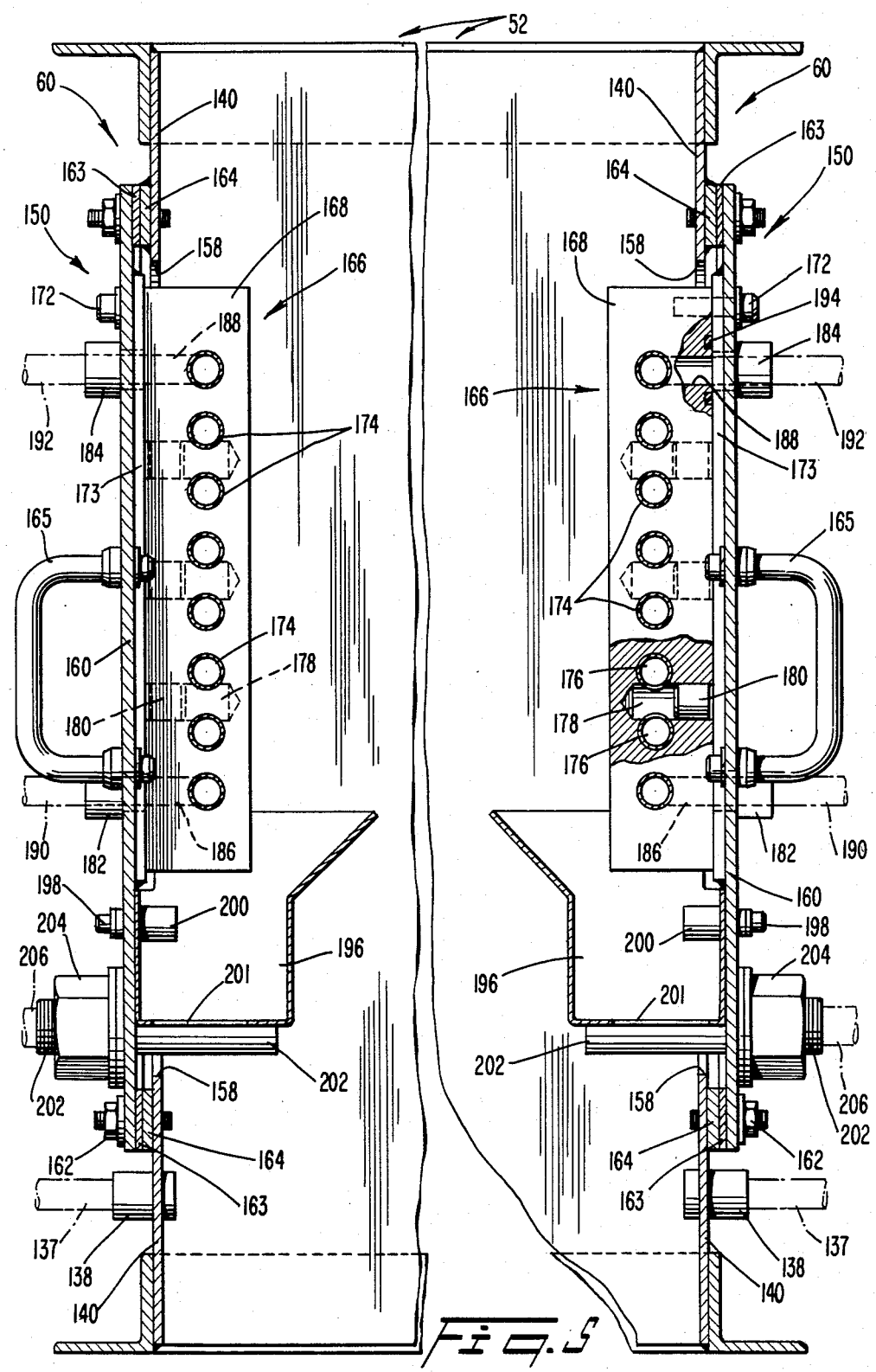

VAPOR CONDENSATION APPARATUS HAVING CONDENSER COIL MODULES

TECHNICAL FIELD

This invention relates to vapor condensation apparatus having condenser coil modules, and more particularly to vapor condensation mass soldering apparatus in which each condensation zone of the apparatus includes condenser coil modules removably mounted on opposite side walls thereof to facilitate apparatus maintenance.

BACKGROUND OF THE INVENTION

U.S. Pat. Nos. 3,904,102 and 4,032,033 to T. Y. Chu et al. disclose vapor condensation mass soldering apparatus of a type which may be used for soldering articles, such as solder-bearing leads, to contact pads on a substrate circuit device. In this apparatus a primary liquid having a boiling point at atmospheric pressure at least equal to the temperature at which the soldering is to be performed, is continuously boiled to establish a body of hot saturated primary vapor having a density greater than that of air at atmospheric pressure. A "blanket" in the form of a body of secondary vapor, having a density intermediate that of the primary vapor and the atmosphere, is produced by boiling a secondary liquid and is floated on the body of primary vapor to reduce losses thereof to the atmosphere.

In use of the above-mentioned vapor condensation soldering apparatus, the articles to be soldered generally are prefluxed and then passed through the body of secondary vapor into the body of primary vapor. Primary vapor then condenses on the articles, with the latent heat of vaporization of the condensing primary vapor heating the articles to the temperature required for the soldering operation. After completion of the soldering operation, the articles are withdrawn from the body of primary vapor through the blanketing body of secondary vapor.

Escape of the secondary vapor from the above-mentioned apparatus is minimized by mounting secondary cooling or condensing coils about the inner periphery of the apparatus adjacent an upper end thereof, to cause condensation of the secondary vapor adjacent an upper end of the secondary vapor blanket. Similarly, primary cooling or condensing coils are mounted internally about the inner periphery of the apparatus at an intermediate level to cause condensation of the primary vapor at an upper end of the body of primary vapor. The condensate from the condensation of the secondary and primary vapors is collected for recycling in suitable troughs extending about the inner periphery of the apparatus below the secondary and primary condensing coils, respectively.

Vapor condensation soldering apparatus as above described frequently requires cleaning or replacement of the condenser coils, particularly where large quantities of rosin flux are used to facilitate the soldering operation. In this regard, rosin flux causes a carbonaceous deposit to build up on the surfaces of immersion heaters used to produce the condensation soldering vapors, causing undesirable overheating of the heaters and thermal degradation of the primary and secondary liquids. The thermal degradation of the primary liquid can produce a build up of hydroflouric acid in the system, causing etching of metal parts, such as the condenser coils. Similarly, the thermal degradation of the secondary liquid, in the presence of organic matter, such as the soldering flux, can produce a buildup of hydrochloric acid, with similar effects. Under very high acid conditions in larger condensation soldering facilities, the thermal degradation of the primary liquid also can cause the deposition of a white crystalline material (perflourobutylamide) on cool surfaces of the apparatus, such as the condenser coils.

In the past, cleaning or replacement of the internally mounted condenser coils of the vapor condensation soldering apparatus was a difficult and time-consuming procedure because of the manner in which the condenser coils were mounted in the apparatus. As a result, the cleaning or replacement of the condenser coils required that the apparatus be taken out of manufacturing service for extended periods of time. Further, since the condenser coils were mounted on interior portions of the apparatus, cleaning or replacement of the condenser coils required that a technician work inside the apparatus, which also was undesirable because of the possible exposure to residual toxic gases (e.g., perflouroisobutylene or phosgene) which may have been generated in the apparatus during operation and which may still remain in the apparatus after it has been shut down.

Accordingly, a primary purpose of this invention is to provide a new and improved vapor condensation soldering apparatus in which cleaning or replacement of condenser coils in the apparatus is greatly facilitated, and in which the need for a technician to work inside the apparatus for this purpose is essentially eliminated.

SUMMARY OF THE INVENTION

In accordance with the invention, vapor condensation apparatus may comprise a primary vapor zone assembly, a secondary vapor zone assembly, an ambient air moisture-removal zone assembly, and a hood assembly, mounted in readily separable, vertically stacked relationship. Each of the primary and secondary vapor zone assemblies, and the ambient air moisture-removal zone assembly, comprises a housing having at least one condenser coil module mounted in an opening in a wall of the housing.

More specifically, each condenser coil module includes a mounting plate having condenser coil means mounted on an inner side of the mounting plate. The condenser coil means includes a plurality of cooling fluid conduits extending between a pair of spaced headers mounted on the inner side of the module mounting plate. Inlet means for introducing cooling fluid into an inlet end of the condenser coil means, and outlet means for carrying the cooling fluid away from an outlet end of the coil means, each extend from one of the headers on the inner side of the mounting plate through the mounting plate to an outer side of the mounting plate. At least the condenser coil modules of the secondary vapor zone assembly and the ambient air moisture-removal zone assembly also include condensate collecting troughs mounted on the inner sides of their module mounting plates and having discharge means extending through the mounting plates.

BRIEF DESCRIPTION OF THE DRAWINGS

FIG. 4 is an enlarged view, partially in cross section, of a secondary vapor zone assembly of the apparatus; and FIG. 5 is a cross-sectional view taken along the line 5—5 in FIG. 4.

DETAILED DESCRIPTION

Figure 1:
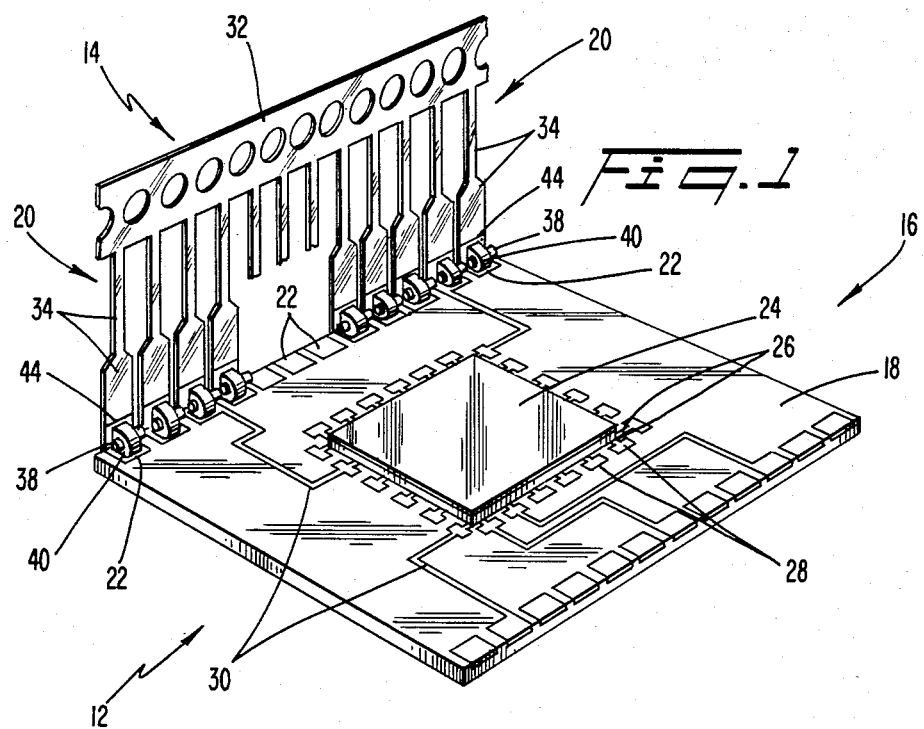
FIG. 1 is an isometric view of a lead-substrate circuit device assembly which may be soldered utilizing apparatus of the subject invention.

Referring to FIG. 1, a lead-substrate circuit device assembly 12 which may be processed with the subject invention includes two lead strips 14 (only one shown) and a substrate circuit device 16. The lead strips 14 are mounted on respective opposite sides of a ceramic or other type substrate 18 of the substrate circuit device 16 with solder-bearing leads 20 of the strips engaged with respective edge contact pads 22 on the substrate. One or more thin film integrated circuit devices 24 (only one shown), such as a silicon chip, also is mounted on the substrate 18 with leads 26 of the chip thermocompression bonded to respective interior contact pads 28 on the substrate. The edge contact pads 22 and the interior contact pads 28 are interconnected by suitable thin film conductor paths 30 on the substrate 18, only a portion of which conductor paths are shown in FIG. 1 for purposes of illustration.

Figure 2:
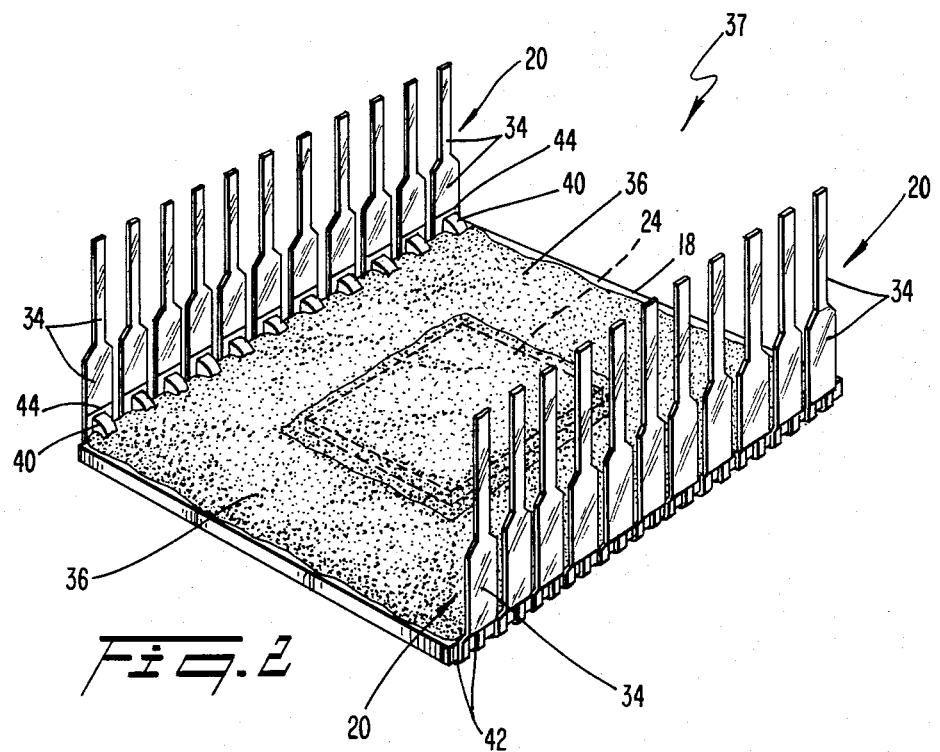
FIG. 2 is an isometric view of the lead-substrate circuit device assembly shown in FIG. 1 after additional processing to form a completed electrical device.

Each of the lead strips 14 includes an elongated continuous support rail 32 having a plurality of the solder-bearing leads 20 projecting therefrom in parallel relationship. The lead strips 14 may be assembled to the substrate 18 utilizing automatic apparatus as disclosed in the U.S. Pat. No. 4,177,554, issued to E. E. Deveres et al. on Dec. 11, 1979. After the leads 20 have been soldered to the contact pads 22 by apparatus in accordance with this invention, the support rails 32 are removed from the leads by severing the support rails from stems 34 on the leads at outer ends of the stems. The substrate circuit device 16 then is partially encapsulated by flowing a room temperature vulcanizing (RTV) material 36 (FIG. 2) over the substrate 18 and the silicon chip 24 in a known manner, to produce a completed electrical device 37 as shown in FIG. 2. The electrical device 37 then is mounted on another substrate, such as a printed circuit board (not shown), by inserting outer narrowed portions of the lead stems 34 through respective apertures in the board and soldering the stems to contact pads adjacent the apertures.

Referring to FIG. 1, each of the soldering-bearing leads 20 may be of a type as disclosed in the U.S. Pat. No. 4,345,814 issued Aug. 24, 1982 in the names of E. A. Gutbier and P. J. Ouellette and entitled "Soldering-Bearing Lead Having Solder Flow-Control Stop Means". In this regard, each of the leads 20 carries a mechanically clamped solder mass or preform 38 for bonding the lead to its respective contact pad 22 on the substrate 18. The solder preform 38, which may be an essentially cylindrical piece of a relatively malleable solder wire, such as a 60-40 tin-lead alloy having a central flux core, is mechanically clamped on an upper surface of a central resilient spring contact finger 40 of the lead with opposite ends of the preform projecting in a cantilevered fashion from opposite sides of the finger. The central resilient spring contact finger 40 and two outer resilient spring clamping fingers 42 (FIG. 2) project from an enlarged inner standoff portion of the lead stem 34 and define a gap in which the substrate circuit device 16 is received as shown in FIG. 1. A solder flow-control stop 44, formed by an oxidized base metal portion of the lead 20, is located on the stem 34 and extends onto the contact finger 40 to a position closely adjacent the solder preform 38. When the solder preform 38 reaches a molten state in a soldering operation, the opposite ends of the preform melt and flow over opposite sides of the contact finger 40 by gravity down to the contact pad 22. When the molten solder resolidifies, a solder connection is formed between the lead 20 and the contact pad 22.

Figure 3:
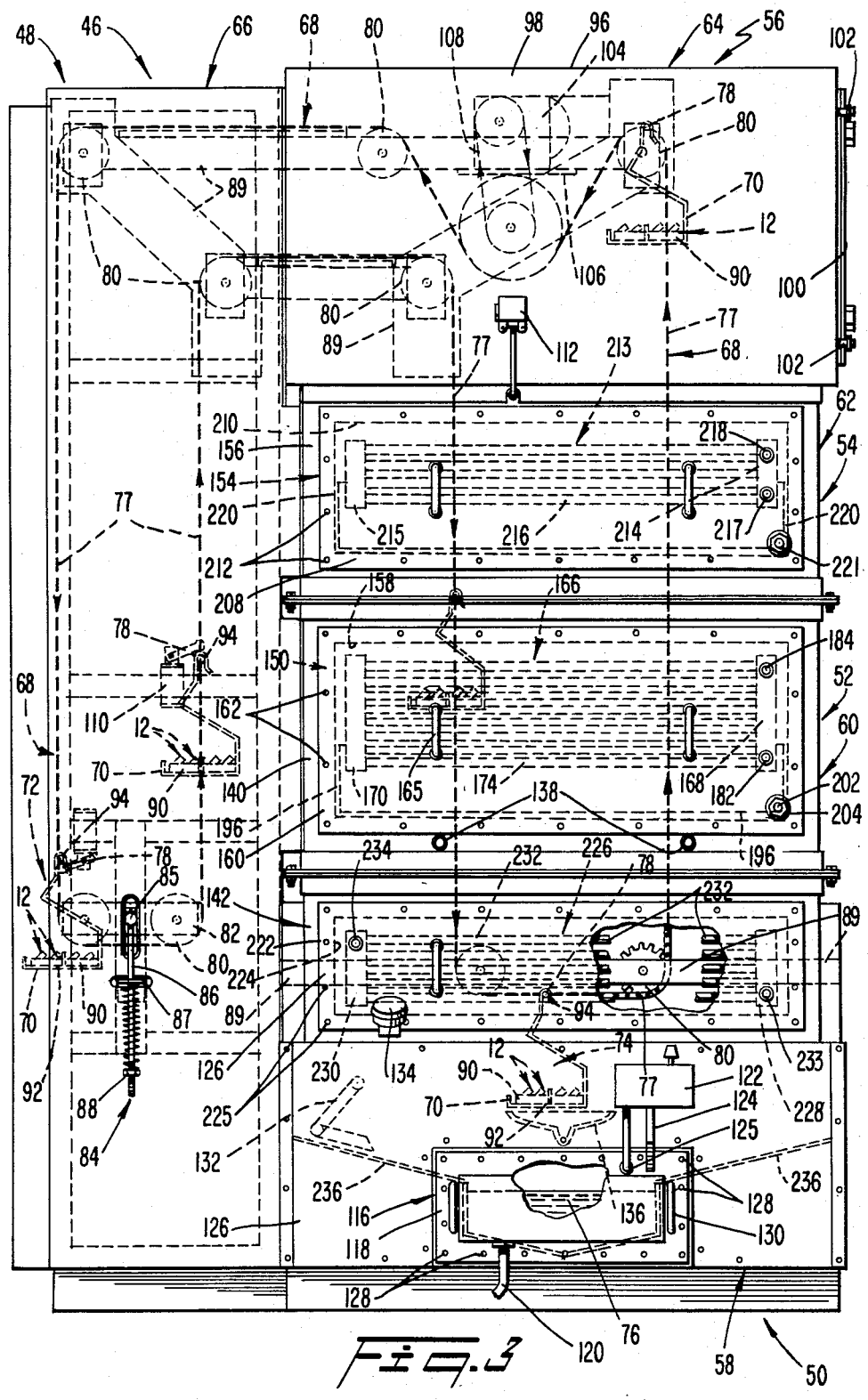
FIG. 3 is a side elevational view of a vapor condensation mass soldering apparatus in accordance with the invention.

Referring to FIG. 3, apparatus 46 in accordance with this invention includes an article load-unload assembly 48, a primary vapor zone assembly 50, a secondary vapor zone assembly 52, an ambient air moisture-removal zone assembly 54, and a hood assembly 56. The assemblies 50, 52, 54 and 56 include housings 58, 60, 62 and 64, respectively, which are mounted in a vertically stacked, readily separable relationship in a suitable manner. The article load-unload assembly 48 also includes a housing 66, which is removably secured to the front (left-hand side of FIG.3) of the vertically stacked housings 58, 60, 62 and 64. An upper end portion of the article load-unload assembly housing 66 opens into the hood assembly housing 64 and the vertically stacked housings 58, 60, 62 and 64 have mating upper and lower open ends to permit the passage of an endless article conveyor 68 therethrough.

In a soldering operation, suitable carriers 70, upon each of which a plurality of the lead-substrate circuit device assemblies 12 have been positioned, are successively supported on the endless conveyor 68 at a load-unload position 72 at the front of the load-unload assembly 48. As the endless conveyor 68 then is driven intermittently to index the carriers 70 through the apparatus 46, each carrier travels upward in the load-unload assembly 48, and into the hood assembly 56. The carrier 70 then travels downward through the ambient air moisture-removal zone assembly 54 and the secondary vapor zone assembly 52, and is indexed into a soldering position 74 in the primary vapor zone assembly 50. In the soldering position 74, primary vapor generated from a boiling primary liquid in a sump 76 of the primary vapor zone assembly 50, then causes the solder preforms 38 (FIG. 1) on the solder-bearing leads 20 to melt and flow down onto the contact pads 22 of each substrate circuit device 16, to solder the leads to the contact pads. The carrier 70 then travels along a return path of the endless conveyor 68 back to the load-unload position 72 for removal from the apparatus 46.

The conveyor 68 is of a known type comprising a pair of horizontally spaced link chains 77, one of which is illustrated by a dashed line in FIG. 3. The conveyor link chains 77 are pivotally mounted at periodic intervals on respective opposite ends of a plurality of spaced horizontally extending support rods 78 upon which the article carriers 70 can be suspended in the apparatus 46. The conveyor link chains 77 travel about suitable sprockets 80 rotatably mounted in the housings 58, 64 and 66.

In this regard, two pairs (only one pair shown) of the sprockets 80 adjacent the lower end of the load-unload assembly housing 66 are rotatably supported on a slide 82 mounted for vertical movement in suitable guideways on opposite inner walls of the housing. The slide 82 is adjustable vertically to tighten or loosen the conveyor 68 by a pair of adjustment mechanisms 84 (only one shown) on each side of the housing 66. Each adjustment mechanism 84 includes a stub shaft 85 fixed to the slide 82 and extending through a vertical slot in the adjacent wall of the housing 66. An external rod 86, which has a headed upper end, extends vertically downward through the stub shaft 85 and a bracket 87 fixedly mounted on the exterior of the housing wall. An adjusting nut 88 is screw-threadably mounted on a lower portion of the rod 86, and a biasing spring extends between the bracket 87 and the adjusting nut 88. The remaining sprockets 80 are rotatably mounted on suitable support bars 89 fixedly mounted within their respective housings 58, 64 and 66.

The lead-substrate circuit device assemblies 12 are transported through the apparatus by the article carriers 70 in suitable trays 90 each having an open mesh bottom and suitable compartments for receiving and supporting the assemblies in an inclined orientation for drainage purposes. Each of the article carriers 70 is in the form of an open-type hangar assembly formed from wire rod so as to have a tray supporting portion 92 at its lower end and spaced supporting hooks 94 (only one shown) at its upper end. In use, one of the trays 90 is loaded with lead-substrate circuit device assemblies 12 and positioned on the supporting portion 92 of one of the article carriers 70 at a position removed from the apparatus 46. The loaded article carrier 70 then is positioned in the load-unload assembly 48 at the load-unload position 72, and is suspended on one of the horizontal support rods 78 of the conveyor 68 by means of the hooks 94.

The hood assembly housing 64 includes a closed top wall 96 and opposed side walls 98 (only one shown). A back wall (right-hand side of FIG. 3) of the housing 64 is defined by a hinged access door 100 suitably mounted for horizontal movement between closed and open positions for maintenance purposes. The access door is retained in a closed position by suitable latches 102.

A conveyor drive motor 104 is mounted on a horizontal support plate 106 having opposite sides secured to adjacent ones of the sprocket support members 89 in the hood assembly housing 64. The motor 104 is connected to the endless conveyor 68 through a suitable chain-and-sprocket drive mechanism 108. The motor 104 also is connected to a suitable controller (not shown) which includes a timer (not shown) for energizing the motor after a preselected dwell time of each set of the lead-substrate circuit device assemblies 12 in the soldering position 74. The motor 104 then is de-energized after a predetermined travel of the conveyor 68, by one of the support rods 78 of the conveyor opening a limit switch 110 mounted in an initial article dwell position in the load-unload assembly 48.

A temperature sensor 112, having a probe extending into the housing 62 of the ambient air moisture-removal zone assembly 54 at the upper end thereof, is mounted on the hood assembly housing 64. The temperature sensor 112 also is connected to the above-mentioned controller (not shown) for the apparatus 46 to deactivate the apparatus in the event of an excessive temperature buildup therein.

The primary liquid for producing the primary vapor for soldering the solder-bearing leads 20 to the substrate contact pads 22 in the soldering position 74 in the primary vapor zone assembly 50 may be of any suitable type, such as a flourinated organic compound available from the Minnesota Mining and Manufacturing Company under the tradename "FLOURINERT FC-70."

The boiling of the primary liquid is accomplished by a suitable electrical heating unit 116 having heating rods (not shown) which are supported at one end in a mounting plate 118 and which have inner portions which project horizontally from the mounting plate in cantilever fashion into the sump 76.

The heating unit 116 is connected by a power cable 120 to a suitable power source, not shown. A heater temperature controller 122 is mounted by a vertical bracket 124 on the mounting plate 118 and has a temperature sensor 125 mounted on and extending through the mounting plate into the primary liquid in the sump 76. The mounting plate 118 is removably mounted in a recessed lower portion of a first vertical sidewall 126 of the primary vapor zone assembly housing 58 by screw-threaded stud-and-nut assemblies 128 and includes a pair of carrying handles 130. Introduction of the primary liquid into the sump 76 may be accomplished through an inlet pipe 132, from a preheater (not shown) as disclosed in the copending application Ser. No. 278,152, now U.S. Pat. No. 4,380,431, entitled "A Technique for Elevating the Temperature of a Fluid", assigned to the same assignee as the subject application, and filed June 29, 1981, in the names of R. C. Carlson, Jr. and E. J. March. A temperature probe 134 also is mounted on the housing sidewall 126 for monitoring the temperature of the primary vapor in the housing 58 above the level of the soldering position 74.

The condensate from the primary vapor which condenses on the solder preforms 38 (FIG. 1) on the solder-bearing leads 20 in the soldering position 74 (FIG. 3) to cause soldering of the leads to the substrate contact pads 22, together with any flux residue, drains from the inclined lead-substrate circuit device assemblies 12 in the trays 90 into a suitable collecting system 136, illustrated generally in FIG. 3. The collecting system 136 is suitably mounted centrally within the primary vapor zone assembly housing 58 beneath the soldering position 74. The flux collecting system 136 drains through a second sidewall 126 (not shown) of the housing 58 to a filter system (not shown) for recovering the primary liquid. For example, the filter system may be the system disclosed in the copending application Ser. No. 278,150 of R. C. Carlson and E. J. March and entitled "Flux Filter", now U.S. Pat. No. 4,378,396, and in the copending application Ser. No. 278,151 of E. J. March and G. M. Wenger entitled "Rosin Flux Filtration System", now U.S. Pat. No. 4,403,949; each assigned to the same assignee as the subject application and each filed on June 29, 1981.

Loss of the primary vapor in the primary vapor zone assembly 50 to the atmosphere is essentially precluded in the apparatus 46 by forming a secondary vapor blanket, having a density intermediate that of the primary vapor and the atmosphere, in the secondary vapor zone assembly 52. Referring to FIGS. 3, 4 and 5, this is accomplished in the apparatus 46 by introducing a secondary liquid, such as that sold by the E. I. DuPont de Nemours Company under the tradename "FREON TF", into the assembly housing 60 through conduits 137 (FIG. 5) connected to inlet ports 138 mounted on opposite vertical sidewalls 140 of the housing adjacent the bottom of the housing. In this regard, the secondary liquid is introduced into the housing 60 at a slow controlled rate such that the liquid vaporizes as it enters the housing, and thus forms the secondary vapor blanket.

Recovery of additional primary vapor for reuse is accomplished in the primary vapor zone assembly 50 by condenser coil modules 142 (one shown in FIG. 3) mounted on upper portions of the sidewalls 126 of the assembly housing 58. Similarly, recovery of the secondary vapor in the secondary vapor zone assembly 52 is accomplished by condenser coil modules 150 (FIGS. 3, 4 and 5) mounted on the opposite sidewalls 140 of the assembly housing 60. The condenser coil modules 150 also minimize escape of the secondary vapor upward into the ambient air moisture-removal zone assembly 54. Additional secondary vapor which does escape upward into the ambient air moisture-removal zone assembly 54 is recovered by condenser coil modules 154 (one shown in FIG. 3) mounted on opposite vertical sidewalls 156 of this assembly. The condenser coil modules 154 also remove moisture from any atmospheric air which tends to move downward in the apparatus 46 from the hood assembly 56, to prevent an undesirable moisture buildup in the apparatus.

Referring to FIGS. 3, 4 and 5 for purposes of illustration, the sidewalls 140 of the secondary vapor zone assembly housing 60 each include a large rectangular opening 158. In accordance with this invention, the condenser coil modules 150 are mounted on the housing sidewalls 140 in respective ones of the rectangular openings 158, and are readily removable from the sidewalls, as integral units, to facilitate maintenance of the apparatus 46.

By way of illustration, with reference to FIGS. 3, 4 and 5, each of the condenser coil modules 150 includes a rectangular planar mounting plate 160 having an interior section which covers the rectangular opening 158 in the adjacent vertical sidewall 140 of the housing 60, and an exterior section which extends peripherally about the interior section and which is removably secured to sidewall by releasable securing devices such as screw-threaded stud-and-nut assemblies 162. More specifically as is best shown in FIG. 5, the mounting plate 160 and a suitable gasket 163 are secured against a raised seat 164 extending peripherally about the adjacent housing opening 158 and formed by elongated bar members welded to the housing 60. A pair of carrying handles 165 also are secured to an outer side of mounting plate 160 adjacent its opposite ends.

As is best shown in FIGS. 4 and 5, a condenser coil assembly 166 is mounted on an inner side of the mounting plate 160. More specifically, a pair of headers 168 and 170 are secured by screws 172 against vertical rectangular seat plates 173 (best shown in FIG. 5) welded to the inner surface of the mounting plate 160 adjacent its opposite ends. Opposite ends of a plurality of horizontally extending, vertically spaced pipes or conduits 174 are seated in circular recesses in respective ones of the headers 168 and 170 and are secured to the headers, such as by welding.

Each of the headers 168 and 170 is formed with internal passages in a suitable manner such that cooling liquid (e.g., chilled water) which is introduced into the first header 168 will flow to and fro between the headers through alternate ones of the pipes 174, respectively, in a serpentine fashion. For example, in the disclosed apparatus 46, as is shown in FIG. 4, the internal passages in each header 168 and 170 are formed in part by first horizontal bores 176 aligned with respective ones of the pipes 174. Referring to FIGS. 4 and 5, selected pairs of the first horizontal bores 176 are vertically interconnected by passageways formed by second horizontal bores 178 drilled into the headers 168 and 170 between each pair of the first horizontal bores perpendicularly thereto and in intersecting relationship to portions thereof, to define the serpentine path for the cooling liquid through the condenser coil assembly 166. A resultant open end of each of the second horizontal bores 178 is blocked by a cylindrical plug member 180 force-fitted therein.

Adjacent the right-hand side of the mounting plate 160, as viewed in FIGS. 3 and 4, a cooling liquid inlet port member 182 and a cooling liquid outlet port member 184 are secured to the outer side of the mounting plate, such as by welding. Referring to FIG. 5, a portion of the inlet port member 182 extends through openings in the mounting plate 160 and the adjacent seat plate 173 and communicates with an inlet passage 186 in a lower end portion of the first header 168. Similarly, a portion of the outlet port member 184 extends through openings in the mounting plate 160 and the seat plate 173 and communicates with an outlet passage 188 in an upper end portion of the first header 168. The inlet and outlet port members 182 and 184 also are internally threaded to receive cooling liquid inlet and outlet pipes 190 and 192 (FIG. 5), respectively, which extend to a cooling liquid supply source, not shown. Leakage of secondary vapor into the cooling liquid in the condenser coil module 150 is precluded by O-ring seals 194 (one shown in the upper right-hand corner of FIG. 5) disposed in annular recesses surrounding the inlet and outlet passages 186 and 188 in the first header 168 in spaced relationship to the passages.

An elongated secondary vapor condensate collecting trough 196 is fixedly supported on the inner side of the mounting plate 160 beneath the condenser coil assembly 166 by screws 198 threaded into internally threaded socket members 200 (FIG. 5) welded to an inner wall of the trough. Condensate which is collected in the trough 196 flows through an opening 201 (FIG. 5) in a bottom wall of the trough adjacent one end thereof, into an outlet pipe 202 welded to the trough. The outlet pipe 202 extends through the mounting plate 160 from the inner side to the outer side thereof and is secured to the mounting plate by a nut member 204 on an externally threaded portion of the pipe. When the condenser coil module 150 is mounted in the apparatus 46 as shown in the drawings, a condensate discharge pipe 206 (FIG. 5) also is screw-threaded into an internal portion of the outlet pipe 202 for conducting the secondary vapor condensate to an acid extraction system, not shown, for recovery of the secondary liquid and subsequent reintroduction of the liquid back into the secondary vapor zone assembly 52 through the inlet port members 138.

Each of the condenser coil modules 154 for the ambient air moisture-removal zone assembly 54 is of essentially the same construction as the condenser coil modules 150 for the secondary vapor zone assembly 52. Thus, as is illustrated in FIG. 3, each of the condenser coil modules 154 includes a rectangular mounting plate 208 removably supported on the housing 62 over a rectangular opening 210 in one of the sidewalls 156 of the housing by screw-threaded stud-and-nut assemblies 212. A condenser coil assembly 213, comprising a pair of spaced headers 214 and 215, is mounted on an inner side of the mounting plate 208, with condenser coil pipes 216 extending between the headers. The header 214 includes inlet and outlet port members 217 and 218, respectively, and a condensate collection trough 220 is secured to the mounting plate 208. However, since the condensing capacity required of the moisture-removal condenser coil modules 154 is less than that required of the secondary vapor condenser coil modules 150, the headers 214 and 215 are of reduced size and the condenser coil pipes 216 are reduced in number, in comparison to the secondary vapor condenser coil modules. Further, the moisture condensate collected in the collecting trough 220 usually includes some condensed secondary vapor which has escaped from the secondary vapor zone assembly 52. Accordingly, as in the case of the collecting trough 196 for the secondary vapor condensate, the collecting trough 220 also drains to the above-mentioned acid extraction system through an outlet pipe 221 for recovery of the secondary liquid.

Similarly, each of the primary vapor condenser coil modules 142 includes a rectangular mounting plate 222 removably secured over a rectangular opening 224 in a respective one of the sidewalls 126 of the housing 50 by stud-and-nut assemblies 225. A condenser coil assembly 226, comprising a pair of spaced headers 228 and 230, is mounted on an inner side of the mounting plate 222 and a plurality of condenser pipes 232 are connected between the headers. As in the case of the moisture-removal condenser coil modules 154, the headers 228 and 230 are reduced in size, and the condenser coil pipes 232 are reduced in number, respectively, with respect to those of the secondary vapor condenser coil modules 150. In this regard, as a result of an uneven number of the condenser pipes 232 being required, cooling liquid is introduced into the condenser coil assembly 226 through an inlet port member 233 in the header 228 and exits from the header 230 through an outlet port member 234. Further, instead of draining into collecting troughs as in the secondary vapor zone and ambient air moisture-removal zone assemblies 52 and 54, primary condensate falls directly from the primary vapor condenser coil pipes 232 onto inclined lower collector plates 236 of the primary vapor zone assembly 50 and then drains back into the primary liquid sump 76 for reuse.

In summary, new and improved vapor condensation mass soldering apparatus, such as the soldering apparatus 46, has been provided which is of modular construction so as to facilitate assembly and disassembly of the apparatus for maintenance purposes. In this regard, the apparatus includes the primary vapor zone assembly 50, the secondary vapor zone assembly 52, the ambient air moisture-removal zone assembly 54 and the hood assembly 56 mounted in readily separable, vertically stacked relationship. The article load-unload assembly 48 also is removably secured to the assemblies 50, 52, 54 and 56. More specifically, each of the assemblies 50, 52 and 54 also includes the condenser coil modules 142, 150 and 154, respectively, which can be mounted on and readily removed from its respective assembly as an integral unit. Accordingly, the condenser coil modules 142, 150 and 154 can readily be coupled to and uncoupled from the remainder of the apparatus 46 completely externally of the apparatus, thus eliminating the necessity for a technician to enter the apparatus for this purpose and possibly be exposed to hazardous fumes. As a net result, maintenance of the apparatus 46 is facilitated and downtime of the apparatus for maintenance purposes is significantly reduced.

What is claimed is:

1. Vapor condensation apparatus, which comprises:

a primary vapor zone assembly, a secondary vapor zone assembly and a hood assembly mounted in separable, vertically stacked relationship;

each of the primary and secondary vapor zone assemblies comprising a separate housing having at least one opening in an essentially vertical wall of the housing, the primary vapor zone assembly housing also having an open upper end in communication with an open lower end of the secondary vapor zone assembly housing, and the secondary vapor zone assembly housing also having an open upper end in communication with an open lower end of a housing of the hood assembly; and condenser coil modules removably mounted on respective ones of the essentially vertical walls of the primary and secondary vapor zone assembly housings;

each of the condensor coil modules including:

(a) a mounting plate having an interior section and an exterior section extending peripherally about the interior section;

(b) releasable securing means for securing the peripherally extending exterior section of the mounting plate to the essentially vertical wall of the respective housing such that the interior section of the mounting plate covers the opening in the essentially vertical wall, the mounting plate also having an inner side facing toward the housing and an outer side facing away from the housing;

(c) condenser coil means mounted on the interior section of the mounting plate on the inner side of the mounting plate for conducting a cooling fluid within the housing, the condenser coil means being of a size such that the condenser coil means can be removed from the housing through the opening in the essentially vertical wall of the housing when the mounting plate is removed from the housing, without removing the condenser coil means from the mounting plate;

(d) inlet means for introducing the cooling fluid into an inlet end of the condenser coil means, the inlet means extending through the mounting plate from the inner side to the outer side of the mounting plate; and (e) outlet means for conducting the cooling fluid from an outlet end of the condenser coil means, the outlet means also extending through the mounting plate from the inner side to the outer side of the mounting plate.

2. Vapor condensation apparatus as recited in claim 1, in which each of the condenser coil means further includes:

spaced headers mounted on the interior section of the associated mounting plate on the inner side of the mounting plate, the inlet and outlet means for the condenser coil means each being connected to one of the headers; and a plurality of conduits extending between the headers parallel to the mounting plate.

3. Vapor condensation apparatus as recited in claim 2, in which at least the condenser coil module for the secondary vapor zone assembly further comprises:

a secondary vapor condensate collecting trough mounted on the interior section of the mounting plate of the condenser coil module on the inner side of the mounting plate and beneath the condenser coil means on the mounting plate for the collection of condensate formed on the condenser coil means, the condensate collecting trough being of a size such that the trough can be removed from the housing through the opening in the essentially vertical wall fo the housing when the mounting plate is removed from the essentially vertical wall of the housing, without removing the trough from the mounting plate; and drain means for the secondary vapor condensate collecting trough extending through the mounting plate from the inner side to the outer side of the mounting plate.

4. Vapor condensation apparatus as recited in claim 3, which further comprises:

an ambient air moisture-removal zone assembly removably mounted vertically between the hood assembly and the secondary vapor zone assembly, the ambient air moisture-removal zone assembly including a housing having open lower and upper ends and an opening in an essentially vertical wall of the housing, the ambient air moisture-removal zone assembly further including at least one condenser coil module removably mounted on the essentially vertical wall of the housing and in the opening in the wall of the housing, the condenser coil module being of the same type construction as the condenser coil module of the secondary vapor zone assembly.

5. Vapor condensation apparatus as recited in claim 4, which further comprises:

an article load-unload assembly having a housing removably secured to the housings of the vertically stacked primary vapor zone assembly, secondary vapor zone assembly, ambient air moisture-removal zone assembly and hood assembly; and endless conveyor means for transporting articles from a load-unload position in the housing of the article load-unload assembly between and through the housings of each of the other assemblies and back to the load-unload position.

6. A vapor condensation assembly for use in a vapor condensation apparatus, which comprises:

a housing having at least one open end and an opening in at least one wall thereof;

a mounting plate having an interior section and an exterior section extending peripherally about the interior section;

releasable securing means for securing the peripherally extending exterior section of the mounting plate to the wall of the housing such that the interior section of the mounting plate covers the opening in the wall of the wall of the housing, the mounting plate also having an inner side facing toward the housing and an outer side facing away from the housing;

condenser coil means mounted on the interior section of the mounting plate on the inner side of the mounting plate for conducting a cooling fluid within the housing, the condenser coil means being of a size such that the condenser coil means can be removed from the housing through the opening in the wall of the housing when the mounting plate is removed from the wall of the housing, without removing the condenser coil means from the mounting plate;

inlet means for introducing the cooling fluid into an inlet end of the condenser coil means, the inlet means extending from the inner side of the mounting plate through the mounting plate to the outer side of the mounting plate; and outlet means for conducting the cooling fluid away from an outlet end of the condenser coil means, the outlet means also extending from the inner side of the mounting plate through the mounting plate to the outer side of the mounting plate.

7. A vapor condensation assembly for use in a vapor condensation apparatus as recited in claim 6, in which: the housing has opposite open ends.

8. A vapor condensation assembly for use in a vapor condensation apparatus as recited in claim 6, in which the condenser coil means includes:

spaced headers mounted on the interior section of the mounting plate on the inner side of the mounting plate, the inlet and outlet means for the condenser coil means each being connected to one of the headers; and a plurality of conduits extending between the headers parallel to the mounting plate.

9. A vapor condensation assembly for use in a vapor condensation apparatus as recited in claim 6, which further comprises:

a condensate collecting trough mounted on the interior section of the mounting plate on the inner side of the mounting plate adjacent the condenser coil means, the trough being of a size such that the trough can be removed from the housing through the opening in the wall of the housing when the mounting plate is removed from the wall of the housing, without removing the trough from the mounting plate; and drain means for the condensate collecting trough extending through the mounting plate from the inner side to the outer side of the mounting plate.

* * * * *